Nov. 5, 1935.     R. E. ADAMS     2,020,227
CONTAINER
Filed April 13, 1935     2 Sheets-Sheet 1
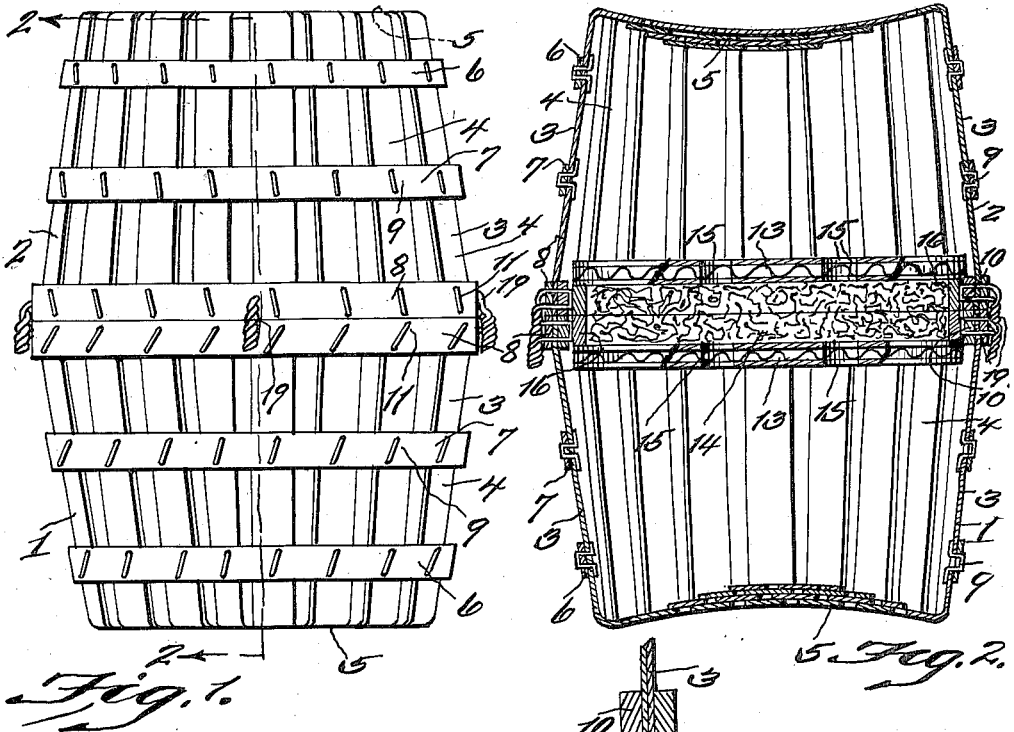
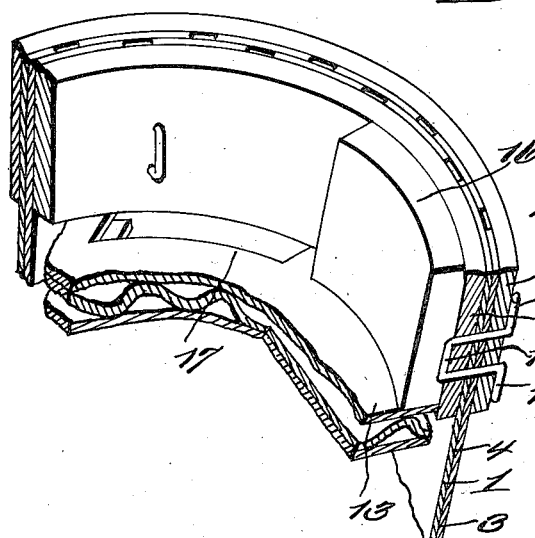
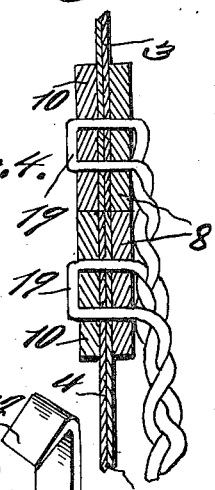
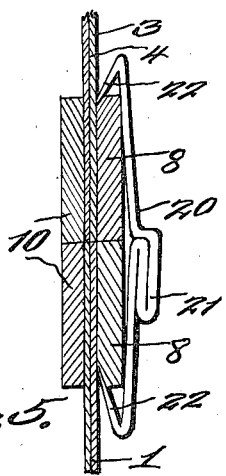
Inventor
Richard E. Adams,
Attorney

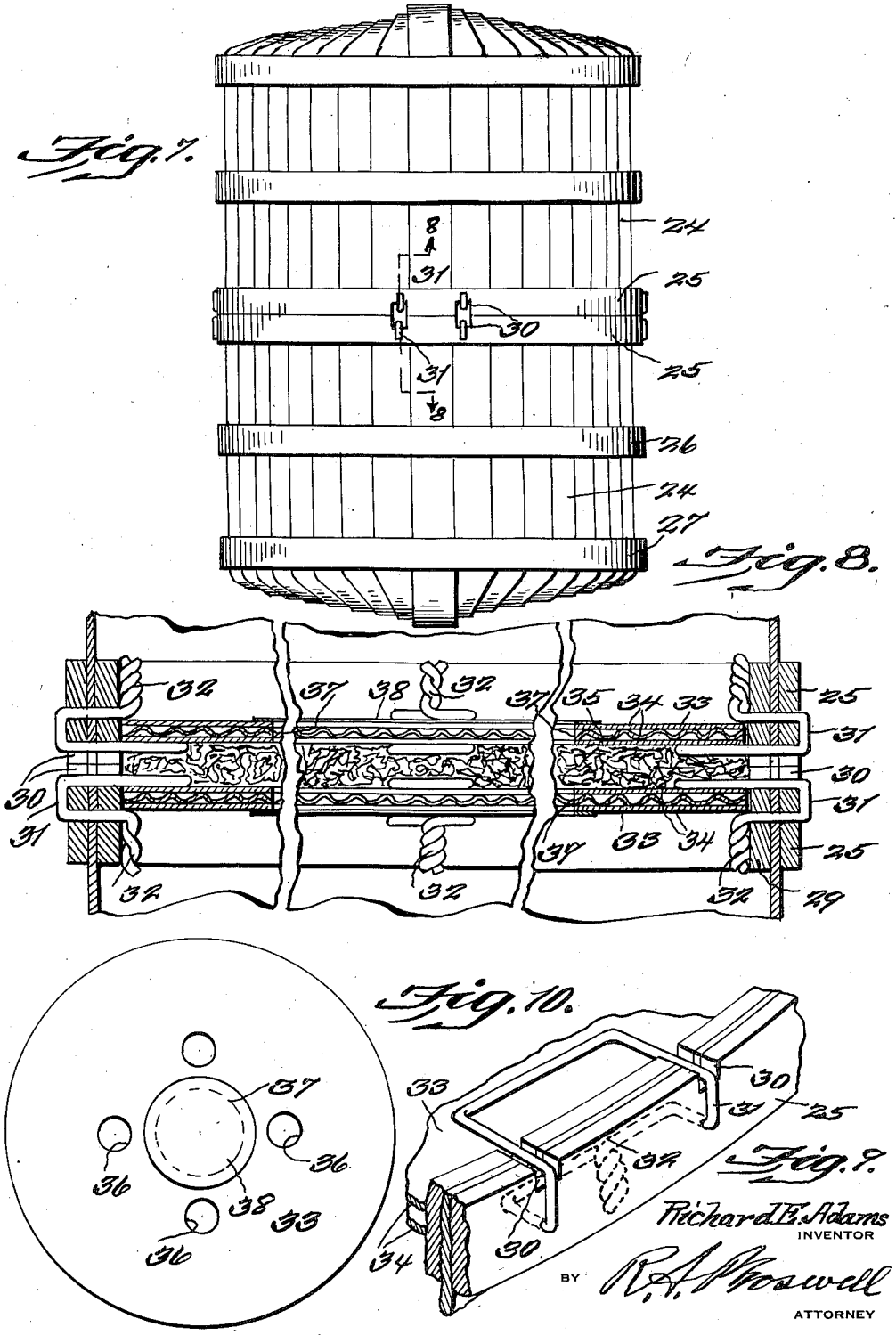

Patented Nov. 5, 1935

2,020,227

UNITED STATES PATENT OFFICE 2,020,227

CONTAINER

Richard E. Adams, Moorestown, N. J.

Application April 13, 1935, Serial No. 16,178

7 Claims. (Cl. 217—122)

This invention relates to an improved container or basket in which various produce, such as perishable fruit and the like may be packed and shipped, the purpose being to insure the utmost protection for the produce.

Experience has shown that it is preferable to use a multiple sectional 32 quart container in lieu of a single 32 quart bushel container, the shipment of the produce being accomplished with greater facility and can be handled with greater ease and more convenience at destinations, by reason of the fact that the multiple sections can be separated, each section of the container having a capacity of 16 quart containers, it being obvious that each section or each 16 quart container can be easily carried and moved from one place to another at destination.

In order to accomplish the purpose in mind the 32 quart bushel container comprises two sections or baskets, each having a capacity of 16 quarts, and one inverted upon the other, that is to say when filled. To arrive at this result each 16 quart container or basket is first filled with the produce or perishable fruit and the like, a lid being mounted on each 16 quart container, in combination with means to hold the lid in place, in which event one 16 quart container is inverted upon the other, there being means to hold the two 16 quart containers fastened together, the lids being so positioned as to afford a space for the reception of shredded paper, excelsior or the like, not only affording an air space but acting as a cushion. When the container reaches its destination the two sections, 16 quarts each, can be separated easily and the lids remain in place, and are easily handled without any difficulty, until it is desired to remove the produce.

Another purpose is to provide improved means for holding the lids in place, and to provide improved means for holding the two sections connected.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of the improved 32 quart container, showing the two sections fastened together.

Figure 2 is a vertical sectional view on line 2—2 of Figure 1, showing wires for holding the two sections together, and illustrating the lids, being spaced and including means for holding the lids in position, the spacing of the lids acting as a compartment for the reception of shredded paper or excelsior or the like to act as a cushion.

Figure 3 is an enlarged detail view showing wire means for holding the lids in position.

Figure 4 is an enlarged detail view showing wire means for connecting the two sections of the 32 quart container.

Figure 5 is a modified construction of clip for engaging the two bands or hoops of the 16 quart containers instead of utilizing wires as in Figures 1 and 2.

Figure 6 is a detail view of the clip shown in Figure 5.

Figure 7 is a view in side elevation of another form of container, with a modified form of lid securing means therefor.

Figure 8 is a sectional view taken approximately on line 8—8 of Figure 7.

Figure 9 is a detail perspective of the connections shown in Figure 8.

Figure 10 is a plan view of one of the lids.

Referring to the drawings 1 and 2 identify two 16 quart container sections or baskets but they may be of any size and shape and made from any suitable material. However the sections shown are made up of thin wood strips 3 with portions 4 extending substantially vertically, and other portions 5 extending radially at different angles across the bottom, there being hoops 6, 7, and 8 on the exterior to hold the strips in place. Suitable staples 9 engage through the hoops and through the strips to hold the structure together. The hoops are exteriorly of the container and are in positions adjacent each other, there being interior hoops 10 adjacent the hoops 8, staples 11 passing through the two hoops 8 and 10 and through the strips and clinched as at 12.

Suitable lids 13 are provided for the 16 quart containers, and are positioned in spaced relation from the edges of the hoops 8 and 10, affording a suitable air space for the reception of shredded paper, excelsior or the like as shown at 14, which constitutes a cushion.

The lids are provided with suitable holes or circular openings 15 for the reception of certain of the fingers of an operator's hand when placing each lid in position, for the purpose of partially turning the lids. The reason for turning the lids is for the purpose of positioning the lids below abutments 16, which are positioned on the hoops 10 at diametrically opposite points. The lids have cut away portions 17, which are of a length a trifle larger than the abutments. In placing the lids in position these cut away portions are first registered with the abutments, and then the lids are pushed down far enough, so that by turning the lids partially by inserting the fingers in said openings, it is possible to turn or rotate the lids partially to bring the solid portions of the lids under the abutments for keeping them in place.

For the purpose of connecting the two 16 quart container sections together, one inverted upon the other as in Figures 1 and 2, wire staples 19 are inserted through the hoops 10 and 8 and the upper ends of the strips which form walls of the containers. The end portions of the wire staples of one container are twisted to the arms of the staples of the inverted container or basket, thereby providing one form of means for fastening the two containers together.

As a modified means to fasten the containers or baskets together sheet metal clips 20 are provided. These clips are each made of a single 22 to engage the upper and lower remote edges sheet metal strip bent to cause a V shaped central portion 21 to be formed, the ends of the sheet metal strip terminating in clinching hooks 22. Normally the sides of the V shaped central portion 21 are spread apart, to allow the hooks of the adjacent hoops 8, and then some suitable tool similar to a pair of pinchers or the like (not shown) may be engaged with the V shaped central portion 21 of the clip, drawing the sides of the V shaped portion 21 together, and the hooks tight against the upper and lower remote edges of the adjacent hoops 8. After the sides of the central V shaped portions 21 are drawn together they may be bent over as shown in the drawings.

In shipping produce it is obvious that one basket or 16 quart container is inverted on the top of the other as in Figure 1, the two sections or containers first having been filled with produce and the lids placed in position, the two containers being securely fastened together in the manner shown. In this manner produce may be safely shipped, and due to the cushion between the two lids, all possibility of injury to the produce is avoided. When the 32 quart container or package reaches its destination, the 16 quart containers may be easily separated, in which event they can be easily handled or moved from one place to another, and by imparting a partial turn or rotation of the lids until the cut away portions register with the abutments the lids can be easily removed for gaining access to the produce.

Referring to Figures 7, 8, and 9 and Figure 10, it will be noted that the 32 quart container is slightly modified. However, it still comprises two 16 quart container sections 24. It will be noted that these container sections 24 are not conical as in Figures 1 and 2. However, these container sections still include hoops 25, 26, and 27 similar to the hoops 6, 7, and 8 and also inside hoops 29 which are similar to the hoops 10. These hoops 25 and 29 have diametrically opposite notches 30 arranged in pairs.

Suitable substantially U shaped wires 31 are inserted through the hoops 25 and 29, and the ends of these wires are twisted together as at 32 to retain them in place. Ordinarily these U shaped wires constitute handles, extending vertically so that the container sections can be carried from one place to another.

Suitable lids 33 in this instance are inserted in the inner hoops 29, and are simulated to the lids 13 in Figures 1 and 2, therefore they comprise the upper and lower pieces 34 and the corrugated inserts 35. When the lids 33 are inserted in place within the upper hoops 29, the handles or U shaped wires 31 are bent over so that their two sides are received in the notches 30, and therefore overlie the lids. By providing these notches 30 it is possible for the two container sections to engage flat against each other as shown in Figures 7 and 8.

The lids 33 are provided with suitable finger receiving openings 36 so that the lids can be rotated and also are provided with central openings 37, over which suitable cellophane sheets 38 are fastened, so that the produce can be observed on the interior of the container sections.

The invention having been set forth, what is claimed is:

1. A multiple sectional container comprising container sections, hoops at their adjacent ends, clips having hooks engaging the remote edges of the hoops, means to draw the clips together on the hoops, lids inserted in the adjacent ends of the container sections and spaced from each other, cushioning means between the lids, and means for securing the lids in closed position, said last named securing means comprising cut away portions adjacent the edges of the lids, and segmental abutments at diametrically opposite parts of the interior of the container sections with which the cut away portions may register allowing the lids to be inserted and partially rotated to bring the lids under the abutments.

2. A multiple sectional container comprising upper and lower container sections, one inverted upon the other, means for fastening said sections together, a lid for each section and being spaced from each other, a cushioning filler between the lids, and means associated with the sections for detachably securing the lids in closed position.

3. A multiple sectional container comprising a pair of container sections, one inverted upon the other, means for detachably securing the sections together, a cushion lid for each section, means associated with the sections for securing the lids in closed position and spaced from each other, a cushioning filler between the lids, said lids having openings therein and transparent means closing the openings.

4. A multiple sectional container comprising a pair of container sections, means for securing one of said sections in an inverted position upon the other, a lid for each section and having diametrically opposite cut away portions, segment abutments secured to the walls of the container sections interiorly thereof at diametrically opposite sides to accommodate the cut away portions upon registering the latter with the abutments and said lids being rotated for disposing solid portions thereof under the abutments to secure the lids in closed position.

5. A multiple sectional container comprising a pair of container sections, one inverted upon the other, hoops included in each section at the outer edges thereof, means received by said hoops for securing the sections together, a lid for each section, means at the adjacent ends of the sections and including means extending between the lids for engagement therewith for securing the lids to their sections in spaced relation to each other, said lids having openings therein, and a cushioning filler between the lids.

6. A multiple sectional container comprising a pair of container sections, one inverted upon the other, hoops included in the sections and disposed at the adjacent ends thereof, clips provided with hooks at their ends for engagement with the hoops for securing the container sections together, outwardly directed V-shaped portions between the ends of the clips and adapted to have their ends clamped together for securing the hoops in binding engagement with the hooks, a lid for each section, means for securing the lids in closed position, and a cushioning filler between the lids.

7. A multiple sectional container comprising container sections, one inverted upon the other, hoops included in each section and some of said hoops being arranged at the adjacent ends thereof, the latter hoops having notches therein, means received by the latter hoops for securing the sections together, a lid for each section, means for securing the lids in closed position and fixed to the hoops and said lid securing means being arranged in the notches for disposal between the lids and for engagement therewith.

RICHARD E. ADAMS.